Nov. 29, 1927.
V. E. PROVOST
1,650,652
CHAIN CONNECTION
Filed March 26, 1927 — 3 Sheets-Sheet 2
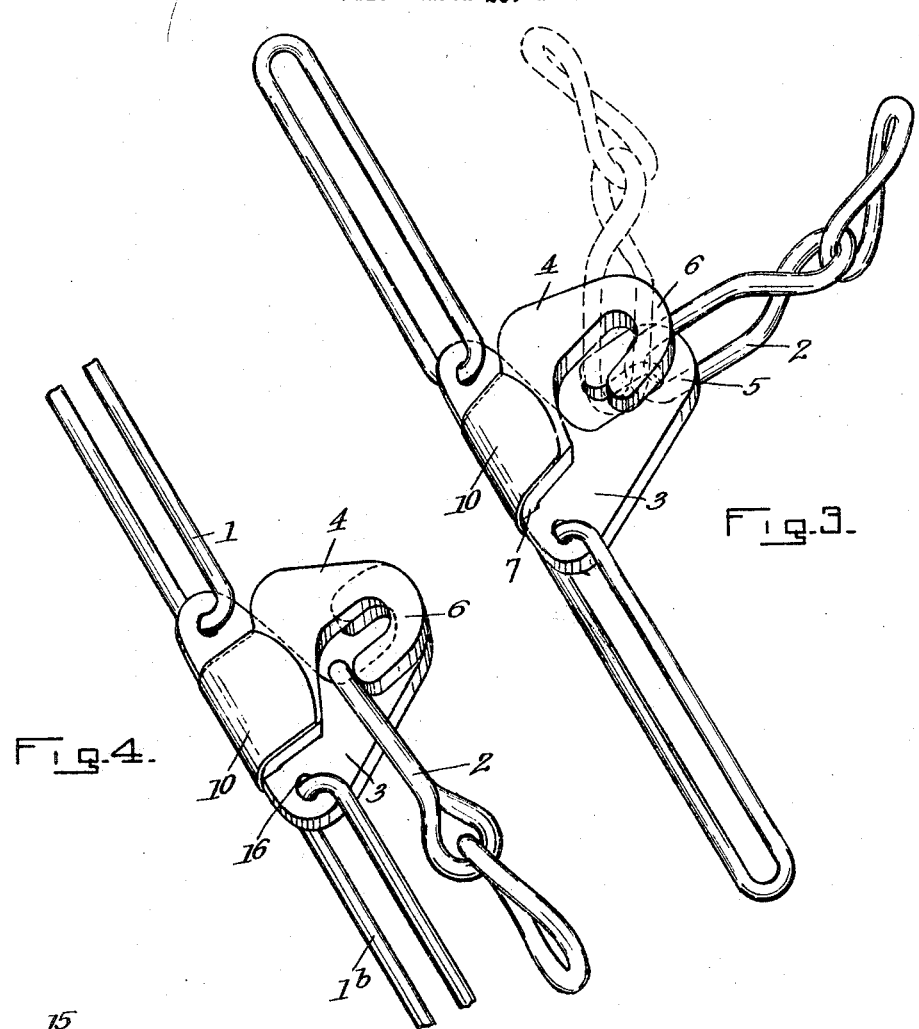
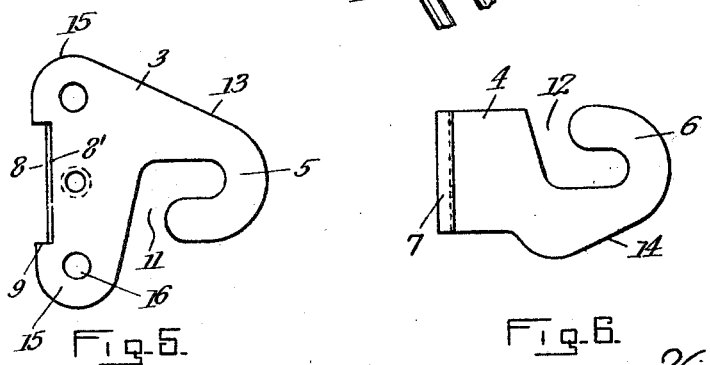
Inventor
Virgil E. Provost
By
Cushman, Bryant Daly
Attorneys Nov. 29, 1927.  
V. E. PROVOST  
1,650,652  
CHAIN CONNECTION  
Filed March 26, 1927 3 Sheets-Sheet 3
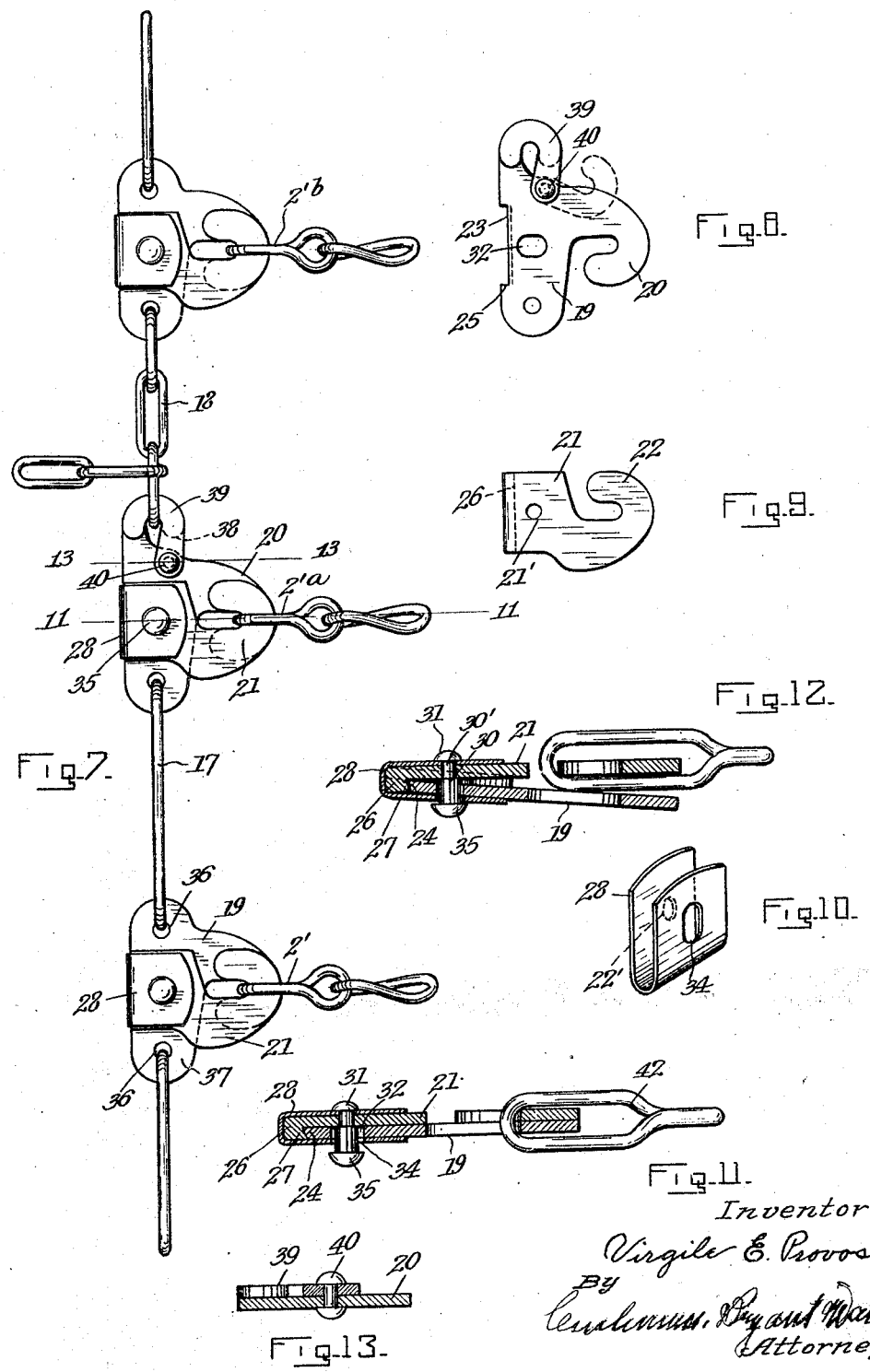
Inventor  
Virgile E. Provost Patented Nov. 29, 1927.

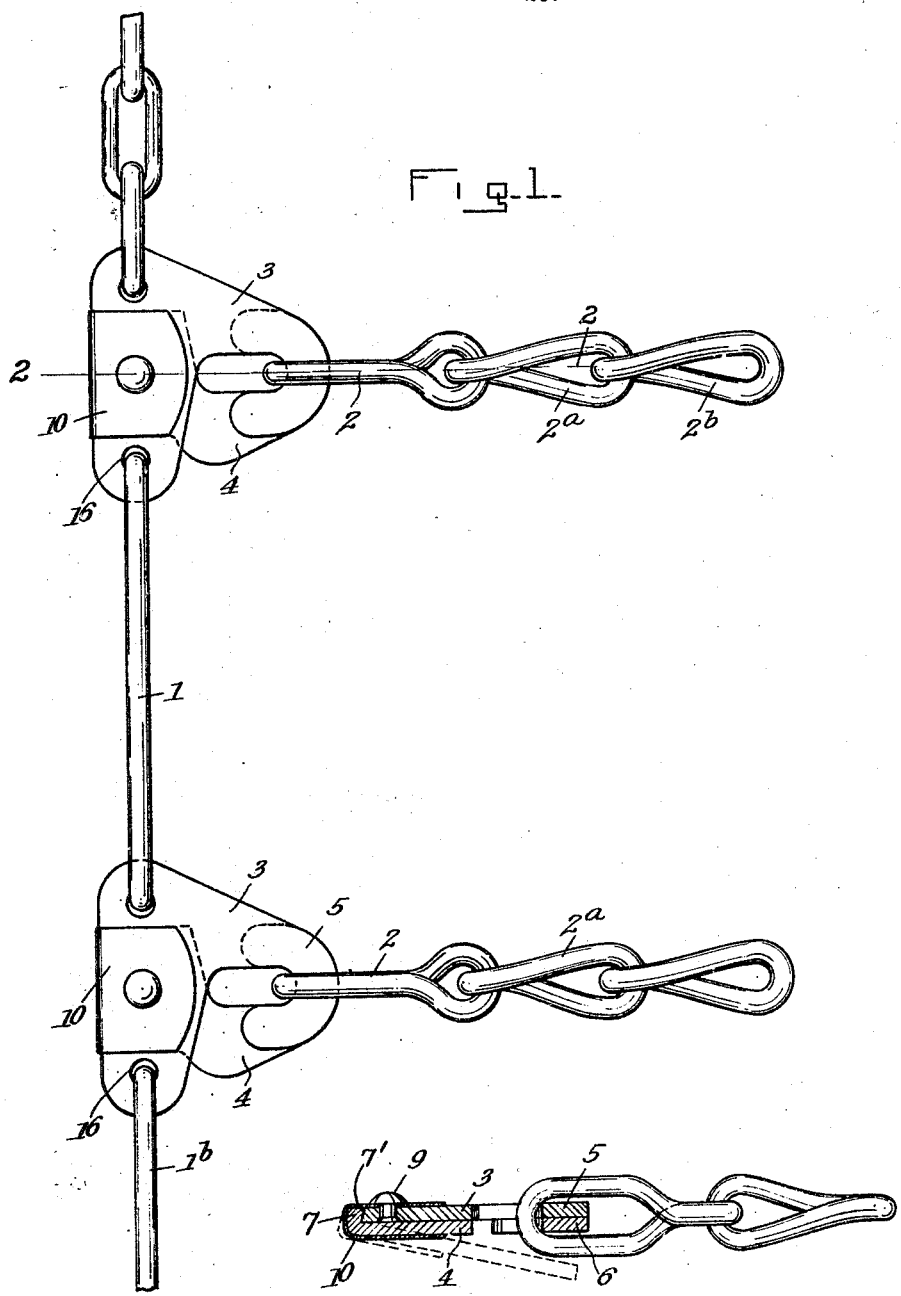

1,650,652

UNITED STATES PATENT OFFICE.

VIRGILE E. PROVOST, OF COHOES, NEW YORK.

CHAIN CONNECTION.

Application filed March 26, 1927. Serial No. 178,717.

This invention relates to chain-connections for chains of the type employed upon the wheels of motor vehicles, and more particularly relates to an improvement upon the construction disclosed in my Patent No. 1,550,454 granted August 18, 1925.

An object of the invention is to provide a device which may be economically manufactured and readily applied to and removed from a wheel without the use of tools.

A further object of the invention is to provide a construction which is very rugged and hence will stand up under severe usage.

The above and other objects of the invention will become clearer as the description proceeds in connection with the preferred embodiment disclosed in the accompanying drawings, wherein Fig. 1 is an elevational view showing two of the devices applied to the longitudinal chain, and each having associated therewith a cross chain.

Fig. 2 is a sectional view on the line 2—2 in Fig. 1.

Fig. 3 is a perspective view showing the initial steps in connecting the end link of a cross chain to the hooks of the connector.

Fig. 4 is a view similar to Fig. 3 showing the last step in connecting the link of the cross chain with the connector.

Fig. 5 is an elevational view showing the construction of one of the members of the device.

Fig. 6 is an elevational view showing the construction of the other member of the device.

Fig. 7 is an elevational view showing a plurality of connector devices of modified and preferred construction applied to the longitudinal chain and each having associated therewith a portion of a cross chain.

Fig. 8 is an elevational view of one member of the connector.

Fig. 9 is an elevational view of the other member of the connector.

Fig. 10 is a perspective of the spring means for yieldingly maintaining the hook members flatly superimposed.

Fig. 11 is a sectional view on the line 11—11 of Fig. 7.

Fig. 12 is a view similar to Fig. 11 showing the separated position of the members.

Fig. 13 is a sectional view on the line 13—13 of Fig. 11.

Referring to the drawings for a more detailed description, 1, 1ª, and 1ᵇ, are links of a longitudinal or circumferential chain such as is commonly applied to automobile tires to prevent skidding.

2 is the end link of a cross chain, other links of the cross chain being designated as 2ª and 2ᵇ.

It will be understood that in the preferred use of the invention, two side chains are employed connected at desired intervals by the cross chains as is well understood in the art.

The present invention relates to the manner of connecting a cross chain with a longitudinal or circumferential chain.

As a means for connecting the end link, 2, of the cross chain with a link, 1, of the longitudinal chain, I employ a pair of members, 3 and 4, terminating at one end respectively in hooks, 5 and 6, adapted to coincidentally engage the end link, 2, of the cross chain, as shown in Figs. 1 and 3.

The members, 3 and 4, are preferably made of sheet-metal and one is flatly superimposed upon the other, the bodies of the two links being pivotally connected together on an axis parallel with the longitudinal chain.

The connection of the members or links, 3, and 4, is preferably effected by providing a laterally directed shoulder portion, 7, on one member, in the present instance, the member 4, adapted to fit into a socket or seat 8, formed on the other member.

The socket 8, in the present instance, is formed with only three sides, namely, the longitudinal side, 8′, cooperating with the inner face 7′ of the shoulder portion, and the side faces 8″, disposed at a right angle to the face 8′, and serving to prevent lateral movement of the members or links relative to one another.

It should be observed that the faces, 7′, 8′, are bevelled or inclined (Fig. 2), so that pull upon the hook ends when transmitted to the inclined faces will cause the latter to throw the projecting shoulder, 7, into its socket.

The interengagement of the two members or links and the normally flat superimposition of the hooks, one upon the other, as illustrated in Figs. 1 and 2, may be yieldingly maintained in any suitable manner, but preferably by means of a substantially U-shaped spring clip, 10, which is fitted upon the ends of the members, and is preferably secured to the flat member, 3, as by a rivet, 9.

The hook, 5, is formed with an opening, 11 on one side, and the hook 6 is formed with a similar opening 12, on its opposite side.

In order to reinforce the hook at its weakest point, the margin or edge, 13, of the hook, 5, and the margin or edge, 14, of the hook, 6, are inclined so as to provide a substantial width at the closed side of the hook.

The arrangement of the openings is thus such that each of the links or members crosses the opening of the hook on the other link when the two hooks are coincident with their flat faces superimposed as shown in the drawings.

To facilitate connection of the device to the longitudinal chain the member, 4, is provided with wing-portions, 15, to receive the links, 1, 1ª, etc., of the longitudinal chain.

In operating the device, when it is desired to connect a cross chain with a longitudinal chain, the link, 4, is swung away from the link, 3, crosswise of the longitudinal chain until the opening, 11, in the hook, 5, of the link, 3, is free for the insertion of the end link, 2, of the cross chain which is then inserted through said opening into the hook, 5, and slid along said hook from the dotted position (Fig. 3) to the position shown in solid lines (Fig. 4).

The link, 4, is then swung back to normal position in which its hook portion, 6, coincides with the hook portion, 5, of the link, 3, except that the openings in the two hooks face in opposite direction.

In this position the end link, 2, of the cross chain is passed through the opening, 2, into the hook, 6, thus being coincidentally engaged by both hooks, 5 and 6, as shown in Fig. 1.

In disconnecting a cross chain the above described operation is reversed; the end link, 2, of the cross chain is brought into the opening, 12, of the hook, 6, of the link, 4, as shown in Fig. 4; the link, 4, is then swung away from the link, 3, to the position shown in Fig. 3, freeing its hook, 6, from said end link, 2, as shown in Fig. 3; the end link, 2, is then slid along the hook, 5, of the link, 3, from the position shown by solid lines, Fig. 4, to that indicated by dotted lines in Fig. 3, and is then drawn out through the opening, 11, in the hook, 5.

Referring to Figs. 7 to 12 inclusive, wherein there is shown a modified and preferred embodiment of the invention, 2', 2'ª, and 2'ᵇ, indicate the end links of a cross chain, which are engaged with the connector device inserted in the longitudinal chain, two of which are employed on each wheel as will be understood. The longitudinal chain consists of a plurality of the connector devices which are connected with the longitudinal chain by means of relatively long links 17 except at the free ends or connecting point of the longitudinal chain where instead of the long link 17, a plurality of short links 18 are employed for detachable engagement with a means upon one of the connector devices whereby the size of the longitudinal chain may be varied as will be understood by selectively connecting different short links 18 therewith.

Each of the connector devices of this form comprises a relatively flat member 19 having a hook 20. Associated with this member is a second member 21 having a hook 22 disposed oppositely with respect to the hook 20 and flatly superimposable on the latter. The member 19 is provided with an end socket 23 having an inclined face 24, corresponding to the face 7' of the previously described construction and end walls 25 disposed at a right angle thereto. This socket serves to receive a projecting lug 26 upon the member 21, the lug forming an inclined shoulder portion 27 cooperating with the inclined face 24 so that during longitudinal strain upon the members in opposite directions the inclined faces will tend to urge the member 19 against the face of the member 20. A spring clip 28, receiving the ends of the members, serves as resilient means for yieldingly maintaining the hooks flatly superimposed and a pin 30 projects through both members 19, 21, as well as the clip for the purpose of anchoring the clip to the member 21, and also to limit the movement of the two members apart when the connector is being engaged and disengaged with the end link of a cross chain.

As is shown clearly in Figures 11 and 12, the pin is provided with a reduced portion 30' which snugly fits through the opening 21' in the member 21, and an opening 22' in the spring clip, and by means of a head 31 is fixedly secured both to the spring clip and the member 21. The opposite end of the pin projects through the relatively flat member 19 which has an elongated opening 32 therein to permit the hook 22 to move freely upon the pin toward and from the hook 20, the clip being formed with an opening 34, which also permits free movement of this portion of the clip relative to the pin. A head 35 upon the pin serves to limit the separation of the members and the tensioning of the spring clip; thus there is provided a rigid stop to prevent such distortion of the spring clip as would cause loss of its resiliency or breakage. It will be observed that the pin thus serves as a means for anchoring or securing the clip to the member 19, and has a stop to limit the separation of the members during connection and disconnection of the device with the cross chain and to limit also the distortion of the spring during separation of the members.

As will be observed from Figure 7, when the device is to be used for connecting the ends of the longitudinal chain in addition to connecting the latter with a cross chain, a portion of the shank of the member 19, instead of being provided with the usual openings 36 in both of the lateral projecting shoulders 37 may at one side be formed so as to be readily engageable and disengageable with an end of the longitudinal chain. As illustrated in Fig. 7, the longitudinal chain may have the relatively short links 18 and the adjacent connector device may have formed thereon the hook 39 integral and rigid with the member 19 thereof. A complementary hook 39 is pivoted to the member 19 as by means of a rivet 40 and opens in an opposite direction from the hook 38 so that when the two hooks are superimposed as shown in Fig. 7, they may be coincidentally engaged selectively with one of the short links 18, the particular link to be selected depending upon the size to which the longitudinal chain is to be adjusted. It will be understood, of course, that ordinarily only one of the connector devices in a single longitudinal chain will be formed with this shank connecting means, which is readily engageable with and detachable from the free end of the longitudinal chain.

The operation of this form of device is substantially the same as the device illustrated in Figs. 1 to 6 inclusive, and the operation of which is particularly illustrated in Figs. 3 and 4.

Referring to all of the several views, it will be observed that the cross chain links are of the usual construction, with the exception of the end links (Figs. 1 and 7) which are twisted to provide an enlarged link portion 42 enabling the cross chain to be readily connected with and disconnected from the hooks of the connector device.

While I have shown my invention in connection with a special structure and as operating in a definite manner, it should be understood that I do not limit my invention thereto, except in so far as it is limited by the scope of the claims annexed hereto.

What I claim as new and desire to secure by Letters Patent is:

1. In a chain-connection and in combination, two members of metal having hooks flatly superimposable one upon the other opening in opposite directions and being coincidentally engageable with the same link of a cross chain, said members being interengaged at the shanks of said hooks, and relatively movable for engagement and disengagement of the link of a cross chain about an axis extending transversely of the chain, said interengagement being effected by means of an integral projection on one member, and a socket on the other member receiving said element, said last mentioned member being substantially flat.

2. In a chain-connection and in combination, two members of metal having hooks flatly superimposable one upon the other opening in opposite directions and being coincidentally engageable with the same link of a cross chain, said members being interengaged at the shanks of said hooks and relatively movable for engagement and disengagement of the link of a cross chain about an axis extending transversely of the chain, said interengagement being effected by means of an integral shoulder on one member, and a socket on the other member receiving said shoulder, said last mentioned member being flat, and a substantially U-shaped spring clip fitting over and receiving the shanks of said members and serving to hold the same in interengagement and the hooks flatly superimposed one upon the other.

3. In a chain-connection and in combination, two members of metal having hooks flatly superimposable one upon the other opening in opposite directions and being coincidentally engageable with the same link of a cross chain, said members being engaged at the shanks of said hooks and relatively movable for engagement and disengagement of the link of a cross chain about an axis extending transversely of the chain, said interengagement being effected by means of a projecting integral element on one member, and a socket on the other member receiving said element and serving to hold the two members against relative lateral movement, said second mentioned member being flat, and a spring clip fitting over and receiving the shanks of said members and serving to hold the same in interengagement and the hooks flatly superimposed one upon the other, said spring clip being fastened to one of said members.

4. In a chain-connection and in combination, two members of metal having hooks flatly superimposable one upon the other opening in opposite directions and being coincidentally engageable with the same link of a cross chain, one of said members having means whereby it is adapted to be connected with a longitudinal chain, one of said links being flat and having a socket, and the other of said members having an integral portion extending into said socket, said socket and integral portion providing an interengaging hinge connection between said members permitting relative movement therebetween about an axis extending transversely of the cross chain, but preventing relative lateral movement.

5. In a chain-connection and in combination, two members of metal having hooks flatly superimposable one upon the other opening in opposite directions and being coincidentally engageable with the same link of a cross chain, one of said members having means whereby it is adapted to be connected with a longitudinal chain, one of said members being flat and having an end socket open at the end of the member, and the other of said members having an integral portion extending into said socket, said socket and integral portion providing an inter-engageable hinge connection between said members permitting relative movement therebetween about an axis extending transversely of the cross chain but preventing relative lateral movement.

6. In a chain-connection and in combination, two members of metal having hooks flatly superimposable one upon the other opening in opposite directions and being coincidentally engageable with the same link of a cross chain, one of said members having means whereby it is adapted to be connected with a longitudinal chain, one of said links being flat and having a socket, and the other of said members having an integral portion extending into said socket, said socket and integral portion providing an interengaging hinge connection between said members permitting relative movement therebetween about an axis extending transversely of the cross chain, but preventing relative lateral movement.

7. In a chain-connection and in combination, two members of metal having hooks flatly superimposable one upon the other opening in opposite directions and being coincidentally engageable with the same link of a cross chain, one of said members having means whereby it is adapted to be connected with a longitudinal chain, one of said links being flat and having an end socket open at the end of the member, and the other of said members having an integral portion extending into said socket, said socket and integral portion providing an inter-engaging hinge connection between said members permitting relative movement therebetween about an axis extending transversely of the cross chain, and a spring clip fitting over the ends of said members serving yieldably to retain the hooks flatly superimposed and said socket and projecting portion interengaged.

8. In a chain connection and in combination, two members of metal having hooks flatly superimposable one upon the other opening in opposite directions and being coincidentally engageable with the same link of a cross chain, one of said members having means whereby it is adapted to be connected with a longitudinal chain, one of said members being flat and having a socket, and the other of said members having an integral portion extending into said socket, said socket and integral portion providing an interengaging hinge connection between said members, permitting relative movement therebetween about an axis extending transversely of the cross chain, and a spring clip fitting over the ends of said members serving yieldably to retain the hooks flatly superimposed and said socket and projecting portion interengaged.

9. In a chain connection and in combination, two members of metal having hooks flatly superimposable one upon the other opening in opposite directions and being coincidentally engageable with the same link of a cross chain, said members being interengaged at the shanks of said hooks, and relatively movable for engagement and disengagement of the link of a cross chain about an axis extending transversely of the chain, said interengagement being effected by means of an integral projection on one member forming a shoulder inclined toward the face of said member, and a socket on the other member having a similarly inclined face adapted to cooperate with the shoulder to urge the members together under longitudinal strain upon the hooks in opposite directions, said member having the socket being substantially flat.

10. In a chain-connection and in combination, two members of metal having hooks flatly superimposable one upon the other opening in opposite directions and being coincidentally engageable with the same link of a cross chain, said members being interengaged at the shanks of said hooks, and relatively movable for engagement and disengagement of the link of a cross chain about an axis extending transversely of the chain, said interengagement being effected by means of an integral projection on one member forming a shoulder inclined toward the face of said member, and a socket on the other member having a similarly inclined face adapted to cooperate with the shoulder to urge the members together under longitudinal strain upon their hooks in opposite directions, said member having the socket being flat and a spring clip fitting over said members retaining the same with the hooks flatly superimposed.

11. In a chain-connection and in combination, two members of metal having hooks flatly superimposable one upon the other opening in opposite directions and being coincidentally engageable with the same link of a cross chain, one of said members having means whereby it is adapted to be connected with a longitudinal chain, means for connecting said members whereby one is movable relative to the other, and resilient means serving yieldably to retain the hooks flatly superimposed one upon the other.

12. In a chain-connection and in combination, two members of metal having hooks flatly superimposable one upon the other opening in opposite directions and being coincidentally engageable with the same link of a cross chain, one of said members having means whereby it is adapted to be connected with a longitudinal chain, means for connecting said members whereby one is movable relative to the other, resilient means serving yieldably to retain the hooks flatly superimposed one upon the other, and a positive stop for limiting the relative movement of said members apart.

13. In a chain-connection and in combination, two members of metal having hooks flatly superimposable one upon the other opening in opposite directions and being coincidentally engageable with the same link of a cross chain, one of said members having means whereby it is adapted to be connected with a longitudinal chain, means for connecting said members whereby one is movable relative to the other, and resilient means serving yieldably to retain the hooks flatly superimposed one upon the other, and a pin extending through said members and serving as a positive stop to limit their movement apart.

14. In a chain connection and in combination, two members of metal having hooks flatly superimposed one upon the other opening in opposite directions and being coincidentally engageable with the same link of a cross chain, one of said members having means whereby it is adapted to be connected with a longitudinal chain, said members being connected whereby one member may be moved relative to the other and resilient means yieldingly maintaining the hooks flatly superimposed one upon the other, said means for connecting one of said members with a longitudinal chain comprising a hook integral with one of said members, and a second hook opening in the opposite direction flatly superimposable upon the first mentioned hook and movable relative thereto, said hooks being coincidentally engageable with the same link of a longitudinal chain.

15. A connector element having means detachably connectable selectively with a link, said means comprising a pair of hooks flatly superimposable one upon the other opening in opposite directions and being coincidentally engageable with the same link, one of said hooks being rigid with a member of said connector and the other being movable with respect to the first mentioned hook, said connector comprising means for engaging a link of a cross chain, and said cross chain engaging means comprising two members having hooks flatly superimposable one upon the other opening in opposite directions and being coincidentally engageable with the same link of the cross chain, said members having connection permitting relative movement therebetween.

16. A connector element having means detachably connectable with a link, said means comprising a pair of hooks flatly superimposable one upon the other opening in opposite directions and being coincidentally engageable with the same link, one of said hooks being rigid with a member of said connector and the other being movable with respect to the first mentioned hook, said connector comprising means for engaging a link of a cross chain, and said cross chain engaging means comprising two members having hooks flatly superimposable one upon the other opening in opposite directions and being coincidentally engageable with the same link of the cross chain, said members having connection permitting relative movement therebetween, and resilient means for yieldingly maintaining the hooks flatly superimposed one upon the other.

17. A connector element having means detachably connectable selectively with a link, said means comprising a pair of hooks flatly superimposable one upon the other opening in opposite directions and being coincidentally engageable with the same link, one of said hooks being rigid with a member of said connector and the other being movable with respect to the first mentioned hook, said connector comprising means for engaging a link of a cross chain, and said cross chain engaging means comprising two members having hooks flatly superimposable one upon the other opening in opposite directions and being coincidentally engageable with the same link of the cross chain, said members having an inter-engaging hinge connection permitting relative movement therebetween, and resilient means for yieldingly maintaining the hooks flatly superimposed one upon the other, and a positive stop for limiting the separating movement of said members.

18. In a chain-connection and in combination, two members of metal having hooks flatly superimposable one upon the other opening in opposite directions, and being coincidentally engageable with the same link of a cross chain, one of said members having means whereby it is adapted to be connected with a longitudinal chain, a pin projecting through said members, one being movable relative to the pin and the other having the pin rigid therewith, resilient means for yieldingly maintaining the hooks flatly superimposed one upon the other, and a positive stop means for limiting the relative movement of said members and the distortion of said resilient means when they are separated.

19. In a chain-connection and in combination, two members of metal having hooks flatly superimposable one upon the other opening in opposite directions, and being coincidentally engageable with the same link of a cross chain, one of said members having means whereby it is adapted to be connected with a longitudinal chain, a pin projecting through said members, one being movable relative to the pin and the other having the pin rigid therewith, resilient means for yieldingly maintaining the hooks flatly superimposed one upon the other, and means for limiting the relative movement of said members and the distortion of said resilient means when they are separated, said means being formed with said pin.

20. In a chain connection and in combination, two members of metal having hooks flatly superimposable one upon the other opening in opposite directions, and being coincidentally engageable with the same link of a cross chain, one of said members having means whereby it is adapted to be connected with a longitudinal chain, a pin projecting through said members, one being movable relative to the pin and the other having the pin rigid therewith, resilient means for yieldingly maintaining the hooks flatly superimposed one upon the other, and means for limiting the relative movement of said members and the distortion of said resilient means when they are separated, said means being formed with said pin, and said pin projecting through said resilient means.

In testimony whereof I have hereunto set my hand.

VIRGILE E. PROVOST.